July 20, 1965 J. B. NICHOLS ETAL 3,195,649
AIRCRAFT ENGINE LUBRICATION SYSTEM
Filed Dec. 17, 1963 2 Sheets-Sheet 1

INVENTORS
John B. Nichols
BY Alfred Bonnell Jr.
Bialos & Schlemmer
Attorneys

INVENTORS
John B. Nichols
Alfred Bonnell Jr.
BY Bialos & Schlemmer
Attorneys

United States Patent Office 3,195,649
Patented July 20, 1965

3,195,649
AIRCRAFT ENGINE LUBRICATION SYSTEM
John B. Nichols, Atherton, and Alfred Bonnell, Jr., Los Altos, Calif., assignors, by mesne assignments, to Hiller Aircraft Company, Inc., Menlo Park, Calif., a corporation of Delaware
Filed Dec. 17, 1963, Ser. No. 331,281
7 Claims. (Cl. 170—160.23)

This invention relates generally to aircraft of the helicopter type. More particularly, this invention relates to a system for supplying operating fluids to helicopter engines. Still more particularly, this invention relates to a lubrication replenishment system for the engines of a helicopter when such engines are mounted on the rotor blades surmounting the helicopter rotor column, preferably adjacent the tips of such blades. This invention has particularly utility in conjunction with rotor blade tip mounted engines of a helicopter which may require operating fluids, such as lubricating oils, to be replenished during operation of the engines.

An important aspect of this invention resides in employing tip mounted turbo-jet engines as a rotor rotation power source for a helicopter. The relatively light weight of turbo-jet engines, when considered in conjunction with their capacity to produce great thrust, make turbo-jet engines particularly well suited for use in helicopter rotor systems.

While ram-jet engines have been employed heretofore on blade tips for effecting rotor rotation (as disclosed in Hiller et al. Patent No. 2,761,635 dated September 4, 1956), the use of turbo-jet engines at rotor blade tips has only recently become practical, particularly for propelling very large aircraft. However, if turbo-jet engines are employed to drive the helicopter rotor, problems are encountered in supplying the necessary operating fluids to such tip mounted engines. In this regard, special considerations must be given to supplying lubricants to the engines, particularly when such engines are employed in very large size helicopters, frequently referred to as flying cranes.

This invention has particularly utility when employed in conjunction with a large size helicopter in which the rotor thereof is driven by one or more turbo-jet engines mounted adjacent each of the blade tips. Because turbo-jet engines include rotating parts which require lubrication, the use of such engines in an aircraft propulsion system requires that means be provided to supply, and replenish as needed, lubricating fluids to the engines.

Hereinafter, this invention will be described with particular reference to an engine lubrication system designed to replenish the lubricating fluid which is dissipated or lost during engine operation. Such a system must be capable of functioning when the engines supplied thereby are operating during rotor rotation or when the rotor is maintained stationary but the engines are running.

The problems encountered, particularly in a large size helicopter, are ones of supply and storage. Storing replenishment fluid at or adjacent the blade tips near the engines (in the nacelles, for example) is not feasible since a very serious rotor blade condition of imbalance would result if an engine at one blade tip used more oil from its supply tank than did its counterpart engine at another blade tip. Such unequal fluid use would reduce the quantity and weight of lubricant stored at one blade tip relative to another blade tip. Consequently, the high centrifugal forces to which a rotor is subjected during rotation would produce disastrous results on the rotor blades, even if only a slight weight differential existed between the respective blade tips.

Similarly, it is not practical to store replenishment lubricant within the blades because such storage would require a discontinuity in rotor blade structural design and would create service and inspection problems. Additionally, problems of blade imbalance also would be encountered, although not to the extent noted above with respect to lubricant storage at the blade tips.

It has been found that problems encountered in the supplying of operating fluids to tip mounted turbo-jet engines of a helicopter rotor, such as the problem of blade imbalance, can be overcome if a replenishment fluid supply is mounted generally in line with the axis of rotation of the helicopter rotor.

From the foregoing, therefore, it should be understood that this invention relates to the provision of an operating fluid supply system for tip mounted helicopter engines; the provision of a supply system in a helicopter employing turbo-jet engines adjacent the rotor blade tips; the provision of a lubricant replenishment system for tip mounted helicopter turbo-jet engines; the provision of a replenishment fluid supply designed to overcome problems of rotor imbalance during engine operation; and the provision in a helicopter operating fluid replenishment system of a fluid supply mounted generally concentrically with the helicopter rotor so that the supply is generally immune to the centrifugal forces to which the rotor blades are subjected.

These and other objects of this invention will become apparent from a study of the accompanying drawings. In this regard, it should be understood that while the features disclosed and described herein have been illustrated in conjunction with very large flying crane type helicopters, the applicability and usefulness of this invention to helicopters of smaller size is practical and desirable.

Figure 1:
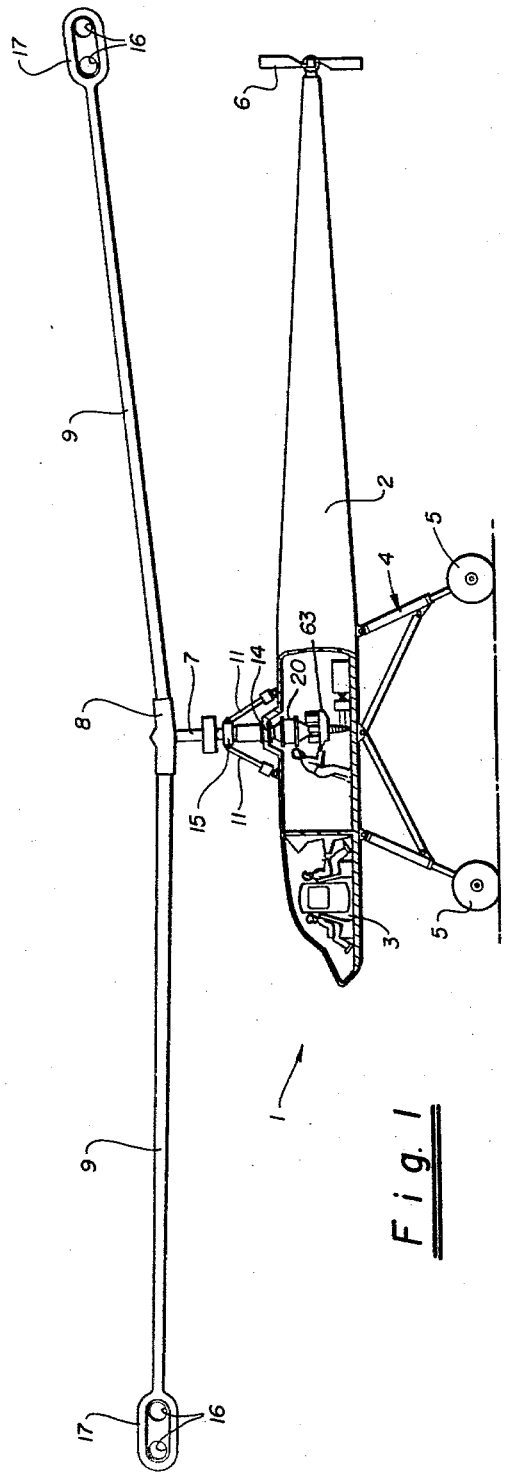
FIG. 1 is a side elevational view of one type of helicopter in which this invention is well suited for use.
Figure 2:
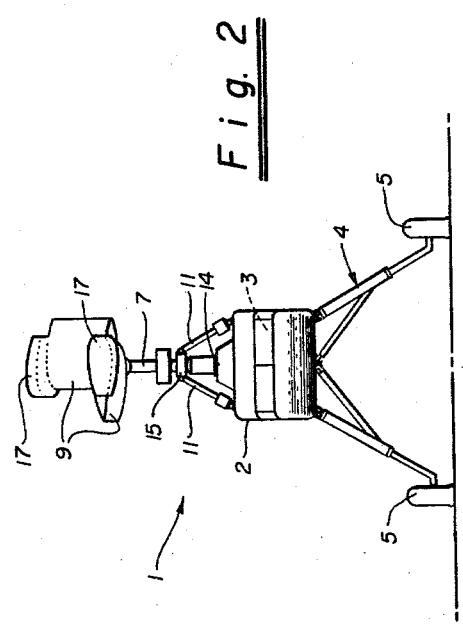
FIG. 2 is a front elevational view of the helicopter of FIG. 1.

Referring to FIGS. 1 and 2, as noted previously this invention has particular utility when employed with a very large size helicopter, generally designated 1. Such a helicopter includes a fuselage 2 of any suitable configuration having a pilot and engineer station 3 at one end thereof. A directional and yaw control tail rotor 6 is mounted at the opposite end of the fuselage for rotation by any suitable means, not shown.

Such a helicopter is supported on a landing surface by an undercarriage or landing gear 4 which, in the illustrated embodiment, includes a series of pneumatic wheels 5. As seen in FIG. 1, the fuselage is of sufficient size to permit movement by a crewman through its interior for purposes of servicing various components of the aircraft, for checking load distribution and the like during flight.

Preferably the opposing portions of the landing gear of the helicopter are sufficiently widely spaced so that the fuselage may be positioned over a load to be supported beneath the fuselage during flight. In this connection, it should be understood that the landing gear shown, as well as the overall configuration of the helicopter shown, are illustrated merely for purposes of example and that modifications thereto are contemplated.

Projecting upwardly from the fuselage in the embodiment shown is a rotor column 7 which is surmounted by a rotor hub or head 8 from which radiate two or more rotor blades 9. Details of the rotor head construction, such as the mechanism for varying the collective and cyclic pitch of the rotor blades, have not been illustrated in this application in that such details form no part of the present invention, and because such details may vary with the particular type of helicopter. However, for purposes of general illustration, a portion of the rotor blade pitch control mechanism of the rotor head assembly has been shown generally at 10 in phantom lines in FIG. 3. Additionally, by way of example only, the rotor head assembly employed may embody the construction disclosed in Hiller et al. Patent No. 2,631,679 dated March 17, 1953. Preferably hydraulic or mechanical-electrical assist means will be provided to actuate the rotor head components.

Figures 3, 4:
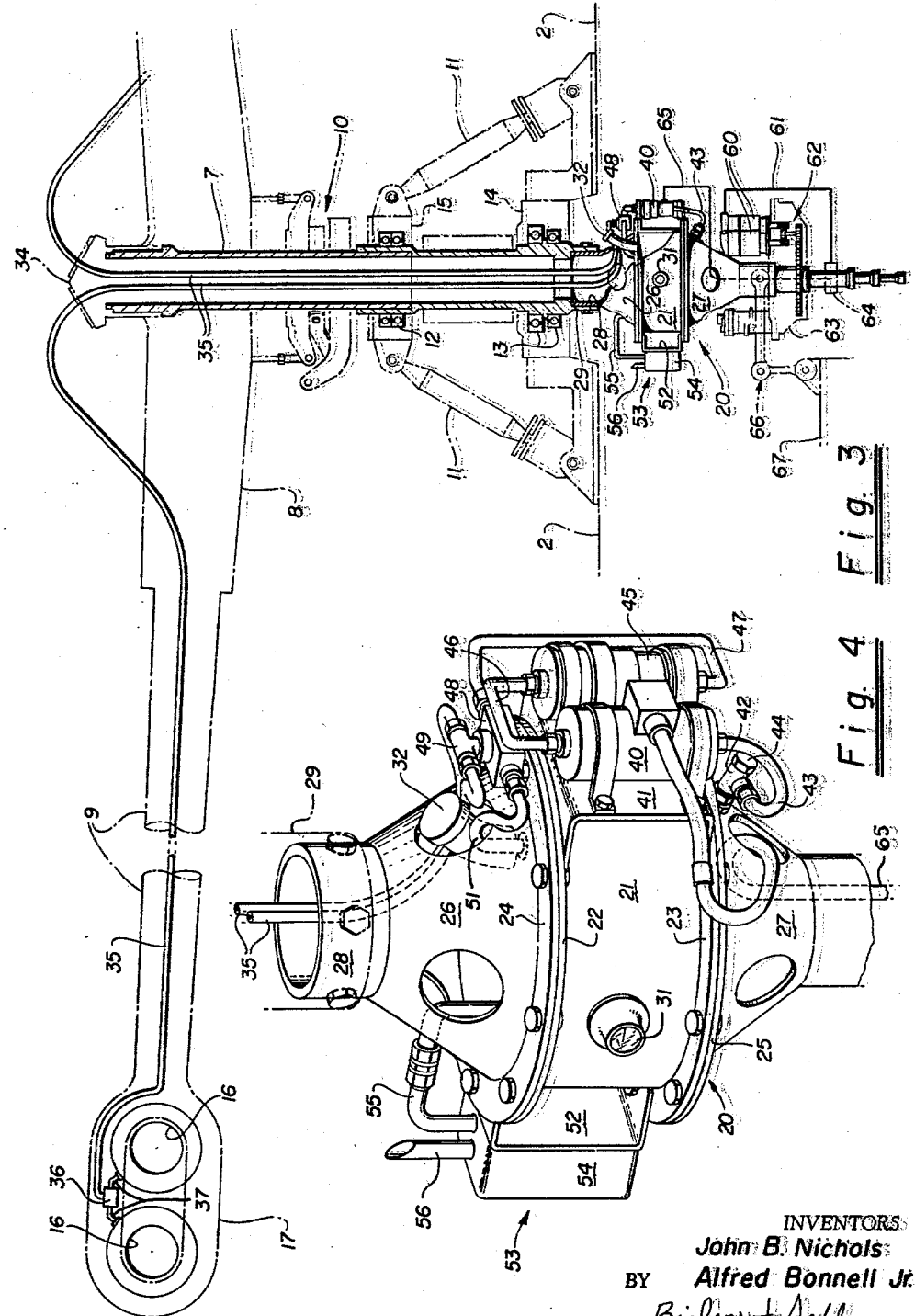
FIG. 3 is a generally schematic view, partly in vertical section, of the fluid replenishment system of this invention showing its relationship to the rotor column and rotor blades of a helicopter rotor system.
FIG. 4 is a generally isometric view of a preferred embodiment of the fluid supply structure of the subject fluid replenishment system, showing its mounting relationship to the helicopter rotor.

The rotor column 7 is supported by two or more brace structures 11 which extend between the top of the fuselage and an intermediate portion of the rotor column between the fuselage and the rotor hub structure. As seen in FIG. 3, the rotor column 7 is hollow and is supported for rotation about an upright axis by two, or more, bearing assemblies 12 and 13. The bearing assemblies are mounted in any suitable fashion in supporting collar 14 adjacent the top of the fuselage and in collar 15 supported by the aforementioned brace structures 11.

The power source for driving the rotor blades comprises at least one engine 16 mounted on each of the rotor blades 9, most effectively, and therefore preferably, at or closely adjacent the tips of the respective blades. In the illustrated embodiment, two engines 16 are mounted at each blade tip in an inboard-outboard side by side arrangement in a nacelle 17 of any suitable construction. It should be understood in this regard, that other mounting arrangements for a pair of engines, such as an over and under mounting, could be employed and also that more than or less than two engines could be employed on each blade, depending upon the power requirements of the particular aircraft. As noted previously, the engines employed are of the turbo-jet type. By way of example, one such engine construction which may be employed is designated the J69-T-29 engine manufactured by Continental Aviation and Engineering Corporation.

Such turbo-jet engines, due to the moving turbine parts therein, require lubrication and the subject fluid system is intended to supply all lubrication fluid necessary for proper operation of the engine or engines mounted at the respective blade tips without incurring any dangers of blade imbalance resulting from unequal lubricant loss or dissipation. In this regard, it is important that the supply of replenishment fluid be positioned so that it does not interfere in any way with operation of the rotor during flight and so that it does not induce aerodynamic drag to the aircraft.

It has been found that a supply of replenishment lubricant may be located without incurring any of the above described disadvantageous features if such a fluid supply is symmetrical and mounted generally in line with the axis about which the helicopter rotor column and its attached blades rotate, or in other words, coaxially with the rotor column. In the preferred embodiment illustrated, the replenishment supply comprises fluid replenishment tank structure generally designated 20 which is mounted by suspension from and adjacent the base of the rotor column within the fuselage of the aircraft as seen in FIG. 1. This supply tank structure, including its associated mechanisms to be described, preferably is mounted concentrically with and completely surrounding the axis of the rotor column adjacent the base of the column, and is secured to the column as a part thereof so as to be rotatable therewith. By thus providing a rotating fluid supply, leakage problems which might otherwise be encountered if a stationary fluid supply were employed, are obviated. That is, because the fluid supply rotates with the rotor column and blades, the problems of sealing joints (e.g. slip ring connections) between stationary and rotating parts is eliminated.

As seen in FIG. 4, the supply tank structure comprises a generally cylindrical tank 21 having means to secure the tank to the rotor column in the form of peripheral flanges 22 and 23 adjacent its upper and lower margins. These flanges are bolted as shown in FIG. 4 (or otherwise secured) to correspondingly dimensioned cooperating flanges 24 and 25 which form part of funnel shaped upper and lower connecting web members 26 and 27 which are provided to connect and support the supply tank 21 intermediate the ends of rotor column 7 as seen in FIG. 3.

The upper connecting web member 26 has a cylindrical upper extension 28 which is received within and bolted, or otherwise secured to, a lower portion 29 of the rotor column 7 just beneath bearing assembly 13 in which the rotor column is rotatable as seen in FIG. 3.

It should be understood that the configuration of the tank 21 in which the replenishment fluid is maintained may take various configurations and that a right circular cylindrical configuration has been shown merely for purposes of illustration.

Preferably, tank 21 is provided at one or more locations in its side wall with a viewing window 31 through which a visual determination may be made as to the quantity of replishment fluid in the tank. Because the tank is positioned within the fuselage of the aircraft, as seen in FIG. 1, a visual check as to the contents of the tank may be made during flight by a crewman.

A filling spout 32 having a suitable closure cap on its upper end communicates with the tank and extends its through the top wall thereof. This filling spout projects upwardly through one of several apertures provided in the connecting web member 26 above the tank as also seen in FIG. 4.

It should be understood that the tank structure illustrated provides the requisite replenishment lubricant for all engines of the helicopter preferably at a single location within the helicopter fuselage, preferably adjacent the base of the rotor column. Thus, the tank does not complicate in any way the construction of the rotor hub, does not increase the aerodynamic drag of the helicopter, is easily accessible for filling and maintenance, and precludes conditions of blade imbalance. Also, preferably the auxiliary equipment required to make the replenishment system effective is positioned in conjunction with the supply tank for rotation therewith at a similarly convenient location for inspection, repair or replacement by a helicopter crewman.

As seen in FIG. 3, conduit means for conveying replenishment lubricant to the respective engines extends between the supply tank 21 and such engines. In this regard, such means comprises one or more supply lines 35, the number of which corresponds to the number of rotor blades surmounting the rotor column. In the two bladed rotor shown, two supply lines 35 are provided, each of which is provided to supply all engines positioned at a given blade tip.

In the arrangement shown in which the supply tank is located adjacent the base of the rotor column, the supply lines extend upwardly in parallel relationship through the hollow rotor column, through the top of the rotor hub as seen at 34, and then into the respective rotor blades at a location adjacent but spaced from the rotor axis. The supply lines extend through the respective blades to their associated engines mounted in the engine nacelles 17 at the blade tip. So that the supply lines will not interfere with teeter movement of the rotor during flight, they are positioned externally of the rotor hub so that the lines may flex and move during hub teetering and like movement. In this regard, the supply lines, at least in the area in which they lie externally of the hub, are formed from strong, yet flexible material, such as a high strength plastic or flexible metal.

As seen in FIG. 3, in each engine nacelle is provided means for selectively cutting off flow of fluid to one or both of the engines mounted in such nacelle. Such means comprises a cut off valve structure 36 positioned between the two engines 16 mounted at the blade tip. While specific details of construction of the cut off valve structure have not been shown, it should be understood that such a valve is selectively actuatable by a crewman of the helicopter, such as the pilot, to preclude flow of replenishment oil into one or both of the engines at a given blade tip. The particular valve employed, by way of example, may be electrically controlled by an electrical arrangement (not shown) which is a solenoid or otherwise actuatable in known fashion. The intended function of such a valve is to selectively block one or both of the inlet conduits 37 which extend from the valve to each of the engines as seen in FIG. 3.

In this regard the fluid cut off valve actually employed, and its crewman actuated controls, must be able to withstand the high "g" forces and high pressures which result from the centrifugal forces to which the rotor system of a large helicopter is subjected. Such cut off valves are provided as a safety measure and may be employed to selectively cut off flow of fluid to a given engine as required during operation, such as if a lubricant leak develops in such engine. Thus fluid flow to the engine may be stopped to prevent complete depletion of the oil supply in the case of such a leak.

In the valve structure embodiment shown in FIG. 3, one valve is illustrated which is capable of functioning to control fluid flow to one or both engines at the blade tip. However, other modifications may be employed in which one valve is provided to control fluid flow to each individual engine.

When fluid is in the supply lines at the top of the rotor column, centrifugal force urges the fluid longitudinally of the blades to the engines as needed. So long as the valve structures 36 are open, fluid may enter the engines as permitted by known metering devices adjacent or within the engines (not shown). In large size helicopters of the type illustrated, it has been found that a means is required to lift replenishment fluid to the top of the rotor column to the location where centrifugal force becomes effective, and also while the engines are operating with the rotor stationary. For this reason a boost pump is provided to move the fluid upwardly through the supply lines in the portion of the supply lines which lie within the rotor column.

While not specifically shown in this embodiment, it should be understood that means preferably are provided within the rotor column and within the respective rotor blades to maintain the supply lines fixed and securely supported to withstand the forces to which they are subjected during rotor operation.

In this connection, it should be understood that in smaller size helicopters employing a rotor column base mounted supply tank that the centrifugal forces on the rotor blades may be sufficient to draw replenishment fluid directly from the supply tank where a vertical head of limited length is encountered. In such case, boost means may be required only to prime the engines or to feed the same when the rotor is stationary. However, with large size helicopters, a boost pump as noted generally is required under conditions when the engines are running.

Referring now to FIG. 4, a fluid boost pump 40 is mounted on a bracket 41 secured for rotation with the supply tank 21 between the flanges 22 and 23 thereof as shown. This pump is operatively connected through a fitting 42 and conduit section 43 with the bottom of the supply tank. A drain plug 44 closes off the end of fitting 42.

Also mounted on bracket 41 adjacent the pump is an oil filter unit 45 operatively connected with the pump by means of an inverted U-shaped conduit 46. Filtered fluid passes from the bottom of the filter 45 through a conduit 47 into a pressure relief valve unit 48 mounted above the pump and filter units.

Projecting from the top of the pressure relief valve 48 is a nipple construction 49 to which the lower ends of the two supply lines 35 are connected. The function of the pressure relief valve 48, as is well known, is to preclude entry of fluid into the supply lines when the supply lines are filled and no replenishment oil is required in any of the engines. Under such circumstances, fluid pumped from the supply tank passes through the pressure relief valve 48 into and through a by-pass conduit 51 connected therewith back into the tank through the top thereof as shown in FIG. 4.

Mounted on the opposite side of the supply tank on another bracket 52 similarly secured to the tank is a venting structure generally designated 53. This structure includes a fluid collecting tank 54 secured to the bracket 52 which is connected by means of an inverted U-shaped conduit 55 to the interior of the supply tank. A vent pipe 56 projects upwardly from the supply tank 54 and cooperates, through the collecting tank 54 and conduit 55 to allow air to enter the supply tank 21 to replace lubricating fluid as the same is withdrawn from the supply tank to replenish the supply in the engines. Collecting tank 54 also functions to catch any fluid which may splash from the supply tank through conduit 55 during operation of the aircraft thus preventing leakage and mess.

While various means may be employed for actuating the fluid boost pump 40, in the embodiment illustrated the pump is electrically actuated by means of one or more electrical generators 60 mounted generally beneath the supply tank 21, as seen in FIG. 3. Preferably, two generators are provided to insure in-flight safety. An electrical conduit 61 extends from the generators to electrically connect the same with the pump as illustrated schematically in FIG. 3. The electrical power source for the generators may vary but, by way of example, in the embodiment illustrated schematically in FIG. 3, the generators are actuated from the rotating rotor column through a gear train arrangement generally designated 62. One gear of the train is mounted on the base of the rotor column for rotation therewith and that gear in turn is meshed with other gears which actuate the generators. The gear train is mounted in a stationary gear box, shown in phantom lines at 63, and it is on the top of the gear box that the generators are mounted. From the generators, electrical conduit 61 is connected to an electrical slip ring connection 64 mounted at the base of the rotor column. Also connected with the slipring 64 is another electrical conduit 65 which extends upwardly through the rotor column and carries electrical current to the boost pump as seen in FIGS. 3 and 4.

Thus, with the subject arrangement, a self-sustaining fluid replenishment system is provided.

It should be understood that gear box 63 in which the gear train arrangement 62 is mounted is secured against rotation in any suitable fashion, such as by a rotation preventing linkage 66 secured at one end to lugs projecting from the top of the gear box and at the other end to the fuselage 67 of the helicopter as shown schematically in FIG. 3.

From the foregoing, it should be understood that this invention involves the provision of a rotating supply of replenishment fluid for tip mounted turbo-jet engines in which the supply tank of the system is mounted axially of the rotor column, preferably concentrically thereof and adjacent the base thereof, so that problems of rotor blade imbalance due to use of varying amounts and due to varying replenishment requirements of the helicopter engines on different rotor blades may be overcome.

Having thus made a full disclosure of this invention, reference is directed to the appended claims for the scope of protection to be afforded thereto.

We claim:

1. A helicopter lubricant replenishment system for helicoper engines which are mounted adjacent the tips of the rotor blades of a helicopter, said rotor blades surmounting a rotor column and being rotatable therewith about the axis thereof when said engines are operating to propel said helicopter; said replenishment system comprising a supply tank mounted as a part of said rotor column and being rotatable therewith, a supply of lubricant in said tank, said tank being substantially symmetrical and substantially coaxial with said column and completely surrounding the axis thereof to obviate imbalance of centrifugal forces as the tank rotates with said lubricant therein, supply lines extending from said supply tank through said rotor blades to said engines through which lubricant is flowable when lubricant replenishment in said engines is required, and valve means in said supply lines adjacent each of said engines which is selectively actuatable by a crewman of said helicopter to cut off flow of lubricant to a given engine as required during operation thereof.

2. The helicopter system of claim 1 in which said supply tank is mounted adjacent the base of said rotor column and is rotatable therewith, and in which said supply lines extend upwardly through said rotor column into and through said rotor blades to said engines.

3. In a helicopter having rotor blades surmounting a rotor column and rotatable with said column about the axis thereof, a turbo-jet engine for driving said blades mounted on each of said blades adjacent the tip thereof, and a system for supplying lubricating fluid to each of said engines comprising a supply tank for said lubricating fluid mounted as a part of and for rotation with said rotor column, a supply of lubricating fluid in said tank, said tank being substantially symmetrical and substantially coaxial with said column and completely surrounding the axis thereof to obviate imbalance of centrifugal forces as the tank rotates with said lubricating fluid therein, a supply line extending through each of said blades between said fluid tank and each of said engines, pump means for forcing fluid from said tank to said engines as required, and valve means selectively actuatable by the pilot of said helicopter in said supply lines adjacent each of said engines for selectively precluding fluid flow to a given engine as required during operation thereof.

4. The helicopter of claim 3 in which said supply tank is mounted adjacent the base of said rotor column, and in which said supply lines extend upwardly through said column into and through said blades to said engines.

5. A lubricant replenishment system for helicopter turbo-jet engines which are mounted adjacent the tips of the rotor blades of the helicopter, said rotor blades surmounting a rotor column and being rotatable therewith about the axis thereof when said engines are operating to propel said helicopter; said replenishment system comprising a supply tank mounted as a part of said rotor column adjacent the base thereof and being rotatable therewith, a supply of lubricant in said tank, said tank being substantially symmetrical and substantially coaxial with said column and completely surrounding the axis thereof to obviate imbalance of centrifugal forces as the tank rotates with said lubricant therein, a pair of supply lines extending from said supply tank upwardly through said rotor column, one of said supply lines extending into and through each of said rotor blades to the engine mounted thereon, and valve means in each of said supply lines adjacent each of said engines which is selectively actuatable by a crewman of said helicopter to cut off flow of lubricant to a given engine as required during operation thereof.

6. The system of claim 5 which includes a fluid pump mounted on said tank, and means powered by rotation of said column for actuating said pump to force lubricant upwardly through said supply lines from said tank.

7. A helicopter comprising a fuselage having a top, a hollow rotor column extending through and above said top and having a plurality of rotor blades connected thereto, a turbo-jet engine mounted on each of said blades adjacent the tip thereof for rotatably driving said blades about the axis of said column, a brace structure fixedly mounted above said fuselage on said top and connected to said column below said blades for supporting said column for rotation with said blades, said rotor column including spaced upper and lower portions and having as a part thereof and rotatable therewith a lubricating oil supply tank connecting said upper and lower portions within said fuselage supported by and suspended from the upper portion of said column, said tank being substantially symmetrical and substantially coaxial with said column and completely surrounding the axis thereof and occupying the space between said upper and lower portions to obviate imbalance of centrifugal forces as the tank rotates with oil therein, and oil supply lines extending upwardly from said tank through said rotor column and through said blades to the engines mounted thereon.

References Cited by the Examiner

UNITED STATES PATENTS

| 2,415,584 | 2/47 | Fleiss | 170—135.4 |
| 2,631,679 | 3/53 | Hiller et al. | 170—160.26 |
| 2,679,295 | 5/54 | Parsons | 170—135.4 |
| 2,761,635 | 9/56 | Hiller et al. | 244—17.19 |
| 2,941,600 | 6/60 | Koning et al. | 170—135.4 |

FOREIGN PATENTS 553,575  5/43  Great Britain.

JULIUS E. WEST, *Primary Examiner.*